US012735271B2

(12) United States Patent
Langwieser et al.

(10) Patent No.: US 12,735,271 B2
(45) Date of Patent: Sep. 15, 2026

(54) CONTAINER HANDLING SYSTEM

(71) Applicant: Krones AG, Neutraubling (DE)

(72) Inventors: Sebastian Langwieser, Abensberg (DE); Robert Szwarc, Neutraubling (DE); Daniel Vogler, Neutraubling (DE); Thomas Gerstenberg, Regensburg (DE)

(73) Assignee: KRONES AG, Neutraubling (DE)

( * ) Notice: Subject to any disclaimer, the term of this patent is extended or adjusted under 35 U.S.C. 154(b) by 981 days.

(21) Appl. No.: 18/054,074

(22) Filed: Nov. 9, 2022

(65) Prior Publication Data

US 2023/0146175 A1 May 11, 2023

(30) Foreign Application Priority Data

Nov. 10, 2021 (DE) ........................ 102021129265.4

(51) Int. Cl.
*B65G 43/08* (2006.01)
*B65G 43/10* (2006.01)

(52) U.S. Cl.
CPC ............. *B65G 43/08* (2013.01); *B65G 43/10* (2013.01); *B65G 2201/0235* (2013.01); *B65G 2203/0233* (2013.01); *B65G 2203/044* (2013.01)

(58) Field of Classification Search
CPC B65G 43/08; B65G 43/10; B65G 2201/0235; B65G 2203/0233;
(Continued)

(56) References Cited

U.S. PATENT DOCUMENTS 7,565,961 B2 * 7/2009 Fiegler .................. B65G 29/00 198/470.1
9,809,392 B2 * 11/2017 Walter .................. B65G 43/10
(Continued)

FOREIGN PATENT DOCUMENTS

DE 102011017448 A1 10/2012
DE 202015103598 U1 9/2015
(Continued)

OTHER PUBLICATIONS

He, S. et al., "Digital Control Technology for Packaging Equipment," National University of Defense Technology Press, Jun. 2002, 10 pages. (Submitted with Partial Machine Translation).
(Continued)

*Primary Examiner* — Michael Collins
(74) *Attorney, Agent, or Firm* — McCoy Russell LLP

(57) ABSTRACT

A container handling system includes first and second rotary machines each comprising transport elements for transporting containers along first and second conveying paths, where the second conveying path is downstream of the first conveying path, a memory device, and a control device configured to determine during transport of a container that first and second transport elements transport containers in the first and second rotary machines and to store identifiers assigned to the first and second transport elements in the memory device, to ascertain whether an error is occurring during transport of the container through the container handling system, and to retrieve a stored identifier from the memory device if it is ascertained that the error has occurred.

14 Claims, 6 Drawing Sheets

(58) Field of Classification Search
CPC B65G 2203/044; B65G 47/847; B65G 29/00; B65G 47/846; G06N 20/00; G05B 23/0264; B65B 43/42; B67C 3/24
See application file for complete search history.

(56) References Cited

U.S. PATENT DOCUMENTS

| | | | | |
|---|---|---|---|---|
| 10,968,048 | B2 * | 4/2021 | Niehr | B65G 47/082 |
| 2005/0103399 | A1 * | 5/2005 | Till | B65G 47/846<br>53/367 |
| 2006/0207859 | A1 * | 9/2006 | Fiegler | B65G 29/00<br>198/478.1 |
| 2014/0298100 | A1 * | 10/2014 | Grimm | B65C 9/40<br>714/37 |
| 2016/0207717 | A1 * | 7/2016 | Senn | B65G 54/02 |

FOREIGN PATENT DOCUMENTS

| | | | |
|---|---|---|---|
| DE | 202016105126 | U1 | 1/2017 |
| DE | 102015219975 | A1 | 4/2017 |
| DE | 102016123695 | A1 | 6/2018 |
| DE | 102017111598 | A1 | 11/2018 |
| EP | 3858750 | A1 | 8/2021 |
| WO | 2015036194 | A1 | 3/2015 |
| WO | 2015036196 | A2 | 3/2015 |
| WO | 2015036197 | A1 | 3/2015 |

OTHER PUBLICATIONS

China National Intellectual Property Administration, Office Action Issued in Application No. 202211402275.9, Nov. 29, 2025, 22 pages. (Submitted with Machine Translation).

* cited by examiner 1
2
3
4
5
6
7
8
9
10
11

14a
14b
14c
14d
15
12
13
16
17
1

CONTAINER HANDLING SYSTEM

CROSS-REFERENCE TO RELATED APPLICATION

The present application claims priority to German Patent Application No. 102021129265.4 filed on Nov. 10, 2021. The entire contents of the above-listed application are hereby incorporated by reference for all purposes.

TECHNICAL FIELD

The disclosure relates to a container handling system and to a method for operating a container handling system.

BACKGROUND

It is known that container handling systems typically consist of various individual stations that a container passes through successively. These stations are often configured as rotary machines in which the containers are conveyed using suitable transport elements. Such transport elements can be clamps, for example, which grip the container at its neck by way of a carrying ring or an engagement groove (so-called "neck handling"). Transport elements with which the containers are transported in an upright position (so-called "base handling"), for example, in the form of so-called "pucks", are also known.

Errors can occur for various reasons during transport through the container handling system, which lead to the container being handled incorrectly or not at all. For example, it is possible that the container is not transferred correctly from one station to the subsequent station, so that the transport element of the subsequent station does not pick up the container correctly. Containers that are not picked up correctly can also slip off during transport and are therefore missing for further processing.

In order to detect such errors during transport, it is known that the containers are inspected at certain points. This can be done, for example, by a light barrier, a camera, or a similar device. However, this error detection is only limited to determining that the container is faulty so that it can be ejected, provided it is not missing altogether, and to trigger the necessary machine reactions, such as material flow interruption, machine stop, etc.

However, until now it has been difficult and time-consuming to identify the cause of the error. Troubleshooting is typically done by visual inspection by an experienced operator. The present disclosure therefore has the object of improving error diagnosis within a container handling system.

SUMMARY

The container handling system comprises a first rotary machine comprising a plurality of transport elements for transporting one container each along a first conveying path, a second rotary machine comprising a plurality of transport elements for transporting one container each along a second conveying path, where the second conveying path is arranged downstream of the first conveying path, a memory device, and a control device, where the control device is configured to determine during transport of a container through the container handling system that a first transport element transports the container in the first rotary machine and to store an identifier assigned to the first transport element in the memory device, to determine that a second transport element transports the container in the second rotary machine and to store an identifier assigned to the second transport element in the memory device, to ascertain whether an error is occurring during transport of the container through the container handling system, and to retrieve at least one stored identifier from the memory device if it is ascertained that an error is occurring during transport of the container.

It goes without saying that the container handling system according to the disclosure is not limited to two rotary machines. The container handling system can comprise a plurality of rotary machines, in particular four or more rotary machines. If the container handling system comprises further rotary machines, then the identifiers of the transport elements that transport the container in the respective rotary machines can likewise be recorded and stored in the memory device. The features described hereafter for the first and/or the second rotary machine can then also be applied accordingly to the further rotary machines.

In the event of an error, the container handling system according to the disclosure makes it possible to immediately identify the identifiers of one or more of the transport elements that were involved in the transport of the container through the container handling system. This significantly simplifies error diagnosis, since these transport elements can then be selectively examined for possible error sources.

In accordance with the general technical knowledge, a rotary machine is herein understood to mean a device whose transport elements run in a rotating manner about an axis, in particular along a circular path or an elliptical path. For example, the rotary machines can be transfer star wheels, infeed star wheels, outfeed star wheels and/or rotating container handling machines, such as a blowing wheel, a rinser, a filling wheel, a labeling table, and/or a capper. In the case of a container handling machine, the transport elements can also take on other functions, for example, in the case of blow molds or filling valves.

The transport elements can be arranged at regular intervals along the circumference of the rotary machine, the so-called "division" or "division sections".

An "identifier" is understood to be a data entry that allows the respective transport element to be identified. For example, the identifier can be a numeric identifier, such that each transport element is assigned a number. The assignment of the number to the transport element is then unique for each rotary machine. An identifier that is unique across the entire container handling system can also be used.

The control device may be configured to determine the identifier of the first transport element and of the second transport element based on a position of a drive of the first rotary machine or of the second rotary machine. In particular, the control device may determine the identifier of the first transport element and of the second transport element based on an angle of rotation of a drive of the first rotary machine or of the second rotary machine. The drives of the rotary machines may, in particular, be servo drives.

For this purpose, in particular, a relationship between the identifier of the first transport element and the identifier of the second transport element and the respective position, in particular, of the angle of rotation of the respective drive may be defined once, for example, in a learning process, in particular when the respective transport element is in a predetermined position, for example, at a transfer point. This relationship may be stored in the memory device. In particular, the position of the drive may be determined at the point in time at which the container is transferred to the first rotary machine or to the second rotary machine, respectively. In other words, the transfer points may be taught. It can thus be determined which transport element of the first rotary machine takes over the container. Similarly, the respective transport element and the respective transfer points can be determined for the second rotary machine and any possible downstream rotary machines. It is possible in this manner to determine the identifiers of the respective transport elements in a simple way, since only the position of the drive of the respective rotary machine needs to be determined.

The control device may comprise one or more controllers which are connected to one another in particular by way of a data bus. For example, a separate controller may be provided for the drives of the rotary machines as well as the furnace or the heating module. This controller of the drives may transmit the position of the respective drives by way of the data bus to a further controller that is responsible for determining the transport elements and storing the identifiers. The latter controller may correspond in particular to the main controller of the container handling system.

The memory device may comprise a shift register, and the control device may be configured to store the identifier of the first transport element and of the second transport element in the shift register.

The term shift register is to be understood herein and hereafter to mean a data structure which has a fixed size, in particular a fixed number of memory elements. The individual memory elements can have any size. The memory elements can have fixed memory addresses, in particular ascending memory addresses. In particular, it is possible for data stored in the shift register not to be stored statically in a specific memory element, but rather to be shifted from one memory element to another memory element of the shift register with each storage operation. For example, data may first be stored in a memory element with a specific memory address. During the next storage operation, this data can be shifted to a memory element which has a different, in particular higher, memory address. In particular, the data may be shifted into a memory element which has the memory address that is immediately subsequent to the memory element used. In particular, it is possible for the data to be removed from the shift register when it can no longer be shifted to a memory element having a higher address. The individual memory elements may be configured such that both the identifier of the first transport element as well as the identifier of the second transport element can be stored together in one memory element. It is furthermore possible for additional data, for example, an identifier for the container or an error flag, to be stored in the memory element.

Storing the identifier of the first transport element and of the second transport element in such a shift register enables particularly efficient use of the memory device. The fixed size of the shift register and the periodic removal of data from the shift register can prevent an unnecessary amount of data from being stored in the memory device.

The shift register may have a predetermined number of memory elements, where the number of memory elements corresponds to a number of transport positions that the container passes through during transport through the container handling system, where the container is moved on from one transport position to the next by a defined transport step. The transport step may correspond to a movement of the container along the respective transport path by one division section of the respective rotary machine or an otherwise defined path. In other words, there may be a memory element in the shift register for each of these transport positions. This enables a virtual representation of the transport path in the memory element and thereby efficient use of the memory device. In particular, it can be ensured in this manner that an identifier of the first and/or of the second transport element can be stored for each transport position that the container can assume during transport.

The control device may be configured to determine a first transport position at which the container is located at a first point in time, in particular based on a position of a drive of the first rotary machine or the second rotary machine, and to store the identifier of the first transport element and/or of the second transport element in the memory element that corresponds to the first transport position. It can thereby be ensured that the identifier of the first and/o of the second transport element stored in the memory element is assigned to the correct container at the correct transport position.

For example, the above-mentioned relationship between the position of a drive of the first rotary machine with the transfer point at the first rotary machine and/or of the second rotary machine with the transfer position at the second rotary machine may be used to determine the transport position. In particular, if the position of the respective drive is known during transfer to the respective rotary machine, then the transport position can be easily computed from the current position of the respective drive. For example, a number of transport steps that have taken place since the transfer to the respective rotary machine can be determined from a difference between the current position of the respective drive and the position of the respective drive during transfer to the respective rotary machine. In this way, the transport position of the container along the entire container handling system can be determined in a simple manner.

The control device may further be configured to determine that, at a second point in time, a specific number of transport steps has taken place since the first point in time, in particular based on a position of a drive of the first rotary machine or of the second rotary machine, and to store in the memory element the identifier of the first transport element and/or of the second transport element which corresponds to the transport position at which the container is located at the second point in time based on the specific number of transport steps. The transport of the containers through the container handling system can therefore be simulated virtually in the shift register. This may be used for error diagnostics since if an error is detected at a specific transport position, for example, for the reason that there is a checkpoint at this transport position, it can be determined immediately by reading out the corresponding memory element which transport elements were involved in transporting the container up to this point.

In this case, the determination that a specific number of transport steps has taken place may be made, in analogy as described above, by comparing the position of the respective drive at the second point in time to the position of the drive at the first point in time.

The control device may further be configured to not store the identifier of the second transport element in the memory device as long as the container is disposed on the first conveying path, or to store a placeholder, in particular zero, as the identifier of the second transport element in the memory device as long as the container is disposed on the first conveying path. By storing the exact identifier of the second transport element only in the memory device when the container is being transferred to the second transport element, it can be achieved that only the identifier of the first transport element is retrieved from the memory device in the event of an error occurring on the first conveying path. Unnecessary troubleshooting at the second transport element can then be avoided. In addition, it can be avoided that the second transport element is recorded in an error statistic, although there is possibly no source of error there.

The control device may further be configured to increment at least one counter for a number of errors for each rotary machine if it is ascertained that an error has occurred during transport of the container along the conveying path of this rotary machine or of a downstream rotary machine. In this way, error diagnostics can be improved since it can be recognized quickly at which points of the container handling system errors occur particularly frequently.

In particular, the at least one counter may comprise a counter for the type of error and/or a counter for the first rotary machine and/or a counter for a rotary machine downstream of the first rotary machine, and/or a counter for the identifier of the first transport element, and/or a counter for the identifier of the second transport element. In this way, troubleshooting can be further improved since, for example, conclusions regarding possible problems can be drawn from the type of error. The type of error may be determined, for example, by visually monitoring the container at a monitoring station. Furthermore, error diagnostics can be further improved since, for example, it can be recognized quickly which transport elements and/or rotary machines of the container handling system are involved in errors particularly frequently.

The object mentioned above is also satisfied by a method for operating a container handling system. The container handling system can have one or more of the features described above.

In particular, the method may comprise one or more method steps for the execution of which the control device described above is configured.

BRIEF DESCRIPTION OF THE FIGURES

Further features of the disclosure shall be explained below with reference to the figures by way of example, where.

DETAILED DESCRIPTION

Figure 1:
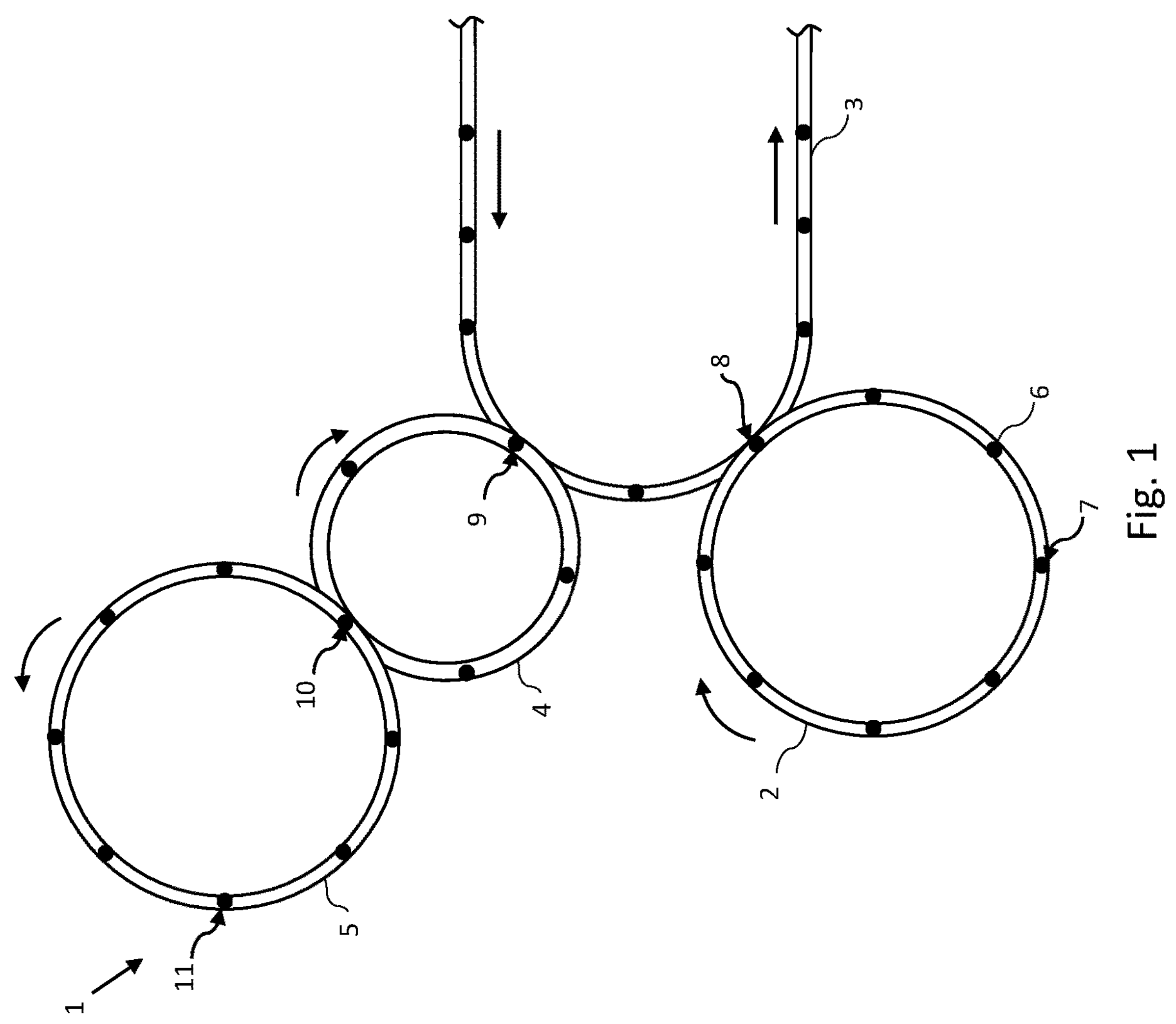
FIG. 1 schematically shows a top view onto a container handling system.

FIG. 1 shows a schematic top view onto a container handling system 1. Container handling system 1 shown comprises four handling stations, each of which is configured as a rotary machine 2 to 5. It goes without saying that container handling system 1 can also have a different number of handling stations. The running direction of respective rotary machines 2 to 5 is shown by the arrows drawn.

Each of handling stations 2 to 5 comprises a plurality of transport elements 6. Transport elements 6 are configured to transport a container each along the conveying section of the respective station. Transport elements 6 each have an identifier that enables unique identification of a transport element 6. This identifier can also be arranged physically on respective transport element 6, for example, on a sign or sticker. In the exemplary embodiment shown, each of rotary machines 2 to 5 is operated by way of a servomotor (not shown) which moves the respective rotary machine about an axis of rotation of the rotary machine. As described further above, the transport path along the individual rotary machines is divided into a certain number of transport steps. Where a transport element 6 is moved in a transport step from one respective transport position of the conveying path of the respective rotary machine to the next transport position. Where each transport step in this example corresponds to a division section.

It can be seen that a transfer point for containers to rotary machine 3 (only partially visible in FIG. 1) is provided for rotary machine 2 after a specific number of transport steps. A transfer point from rotary machine 3 to rotary machine 4 and a transfer point from rotary machine 4 to rotary machine 5 are likewise provided. The transfer of a container from one rotary machine to the subsequent rotary machines always takes place after a number of transport steps that is characteristic of the respective rotary machine.

In the illustrated embodiment of container handling system 1, the container is first transferred to first rotary machine 2 at transfer point 7. After five transport steps, the container is transferred from rotary machine 2 to rotary machine 3 at transfer point 8. After another one hundred transport steps, the container has passed through rotary machine 3 and is transferred to rotary machine 4 at transfer point 9. The container is moved a further three transport steps in rotary machine 4 and transferred to rotary machine 5 at transfer point 10. After a further five transport steps, the container has passed through rotary machine 5 and leaves container handling system 1 at transfer point 11. In the illustrated embodiment, the entire transport path that the container covers in four rotary machines 2 to 5 of container handling system 1 therefore comprises a total of 113 transport steps.

The container handling system shown in FIG. 1 can be in particular a blow molding machine for manufacturing plastic containers from preforms. Rotary machine 2 can be, for example, an infeed star wheel, in particular a saw-tooth star wheel, for the preforms. Rotary machine 3 can be a heating section, in particular a furnace. Rotary machine 4 can be the infeed star wheel for blowing wheel 5. The formed container can be transferred at transfer point 11 to an outfeed star wheel (not shown) and from there to another downstream machine, such as a coating machine or a filler and/or labeler and then optionally to a capper.

Figure 2:
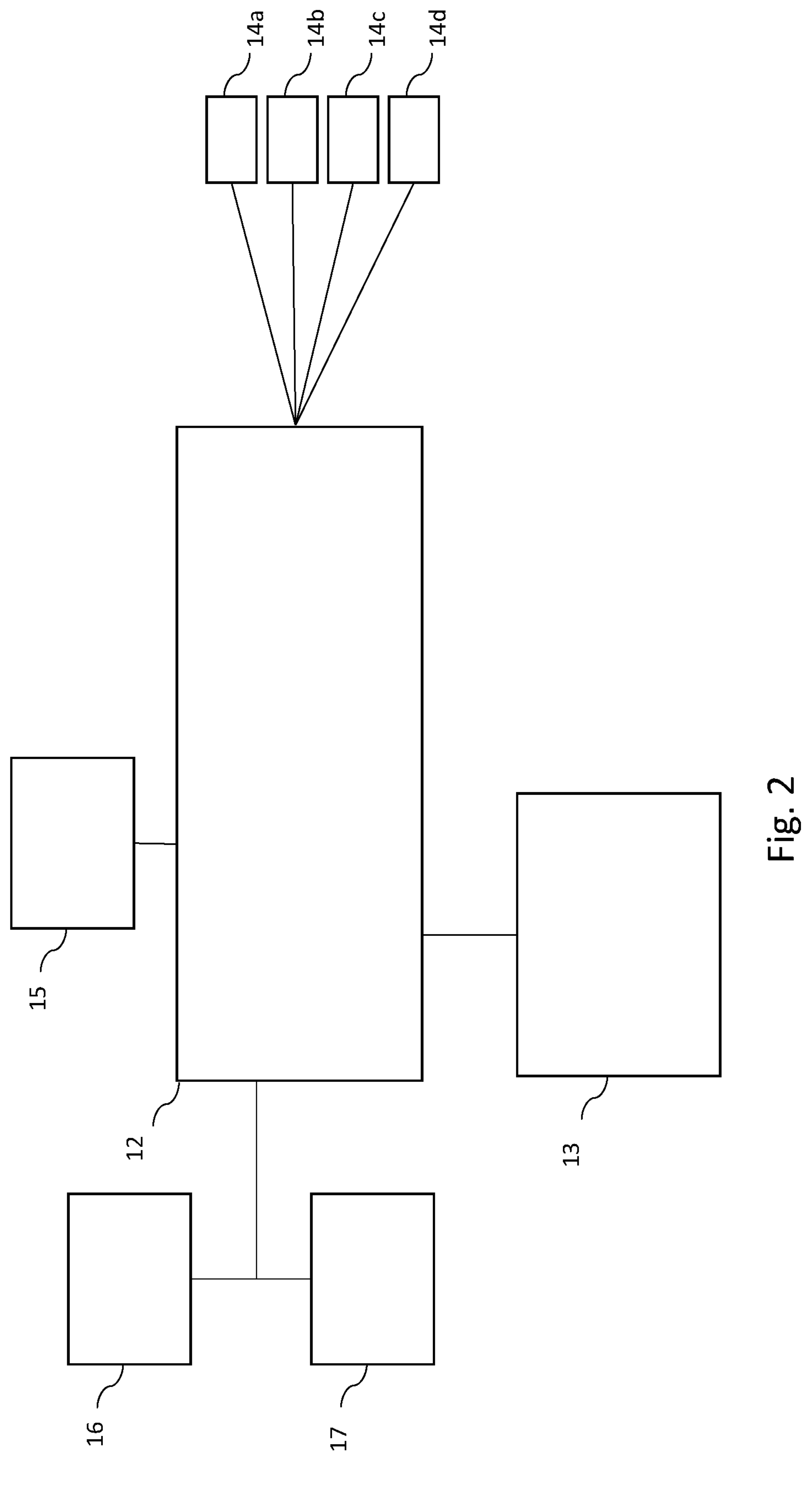
FIG. 2 schematically shows the components of a container handling system in a block diagram.

FIG. 2 schematically shows the components of a container handling system 1 in a block diagram. This can, in particular, be container handling system 1 shown in FIG. 1. It can be seen in FIG. 2 that container handling system 1 has a control device 12 and a memory device 13 which can communicate with one another. Furthermore, container handling system 1 comprises four drives 14*a* to 14*d* which are each configured to drive one of rotary machines 2 to 5. Control device 12 can comprise multiple separate controllers that are interconnected by way of a data bus (not shown). In particular, control device 12 can comprise a drive controller that controls drives 14*a* to 14*d* and, in particular, can determine the position of respective drives 14*a* to 14*d*. The drive controller can transmit the position of respective drives 14*a* to 14*d* by way of the data bus to a further controller of control device 12 that is responsible for determining transport elements 6 and storing the identifiers. The latter controller can correspond in particular to the main controller of container handling system 1.

With reference to FIG. 1, for example, drive 14*a* moves first rotary machine 2, drive 14*b* moves second rotary machine 3, drive 14*c* moves third rotary machine 4, and drive 14*d* moves fourth rotary machine 5.

Container handling system 1 furthermore comprises one or more control units 15 which are configured to check the individual containers during transport through container handling system 1. Control units 15 can be arranged, for example, along the respective conveying paths of rotary machines 2 to 5. Control units 15 can have, for example, one or more optical sensors.

Control units 15 are configured in particular to record control data, for example images, of a transport unit and/or a container, by way of which it can be ascertained whether an error has occurred during transport of the container. An error can manifest itself, for example, in the fact that the container has not been correctly formed or treated, or that a transport element 6 does not transport any container, that is to say that the container has been lost during transport. These cases are by way of example only, and it is to be understood that there are a number of other errors, the effects of which can be detected by control units 15.

Control units 15 can communicate with control device 12. In particular, control units 15 can transmit the control data mentioned to control device 12. Control device 12 can determine based on the control data received whether an error has occurred during transport of a container. It is also possible for control device 12 to determine a type of error that has occurred based on the control data. It is also possible that processing of the control data already takes place in control units 15, and that control units 15 forward the occurrence and the type of error to control device 12.

Container handling system 1 furthermore comprises a display device 16 and an input device 17. Display device 16 can be used to display, for example, status information of container handling system 1 to a user. Input device 17 can be used, for example, to configure settings for container handling system 1. It is possible for display device 16 and input device 17 to be configured as an entity, for example as a touchscreen.

Furthermore, container handling system 1 can additionally or alternatively comprise a communication device (not shown) for receiving and sending data. For example, status information can be sent by way of the communication device to an external device, for example, a smartphone or a tablet, and displayed and analyzed there. It is also possible to perform remote configuration of container handling system 1 using the communication device.

During operation of container handling system 1, control device 12 can request data from drives 14*a* to 14*d* for determining the transport position of a container and the identifier of transport elements 6 that transport the container. In order to be able to easily identify a current transport position of a specific container during operation, a learning process can be carried out prior to the operation of container handling system 1, in which specific parameters are linked to the position of respective drives 14*a* to 14*d*. This can be in particular be the identifier of transport element 6 which, in the position of respective drive 14*a* to 14*d*, is located at the transfer point at which a container is transferred to respective rotary machines 2 to 5. The learning process can be carried out in particular prior to container handling system 1 taking up operation for the first time, after conversion of container handling system 1, and/or after one or more components of container handling system 1 have been replaced.

Such a learning process is described below by way of example with reference to FIGS. 1 and 2. A container is first transferred to first rotary machine 2 at transfer point 7. The identifier of transport element 6 taking over the container at transfer point 7 is recorded. In addition, the current position of drive 14*a* is determined. This position can be described, for example, by a present angle of rotation of drive 14*a*. A relationship between the transport element 6 which takes over a container when it enters rotary machine 2 and the position of drive 14*a* is thus defined. This relationship can be stored in memory device 13.

This process is repeated for all subsequent rotary machines, where the position of drives 14*b*, 14*c*, and 14*d* are correlated with the identifier of respective transport elements 6 of rotary machines 3, 4 and 5 at transfer points 8, 9 and 10. Such a learning process can be carried out individually for the individual rotary machines. However, it is also possible to carry out the learning process for entire container handling system 1 as a whole. In this case, the relationship between the identifier of the transport element 6 of first rotary machine 2 and the position of drive 14*a* can first be defined as described above. The container is thereafter moved eight transport steps forward (in a so-called "inching operation", in which the container by manual operation lets the container handling system rotate as a whole, whereby certain positions can be approached more precisely and respective moved onward by one division section), so that it is transferred at transfer point 8 to rotary machine 3. At this point, the identifier of the transport element 6, which takes over the container into rotary machine 3, as well as the current position of drive 14*b* are determined. This establishes the relationship between the identifier of the transport element 6 of second rotary machine 3 and the position of drive 14*b*. This process is repeated until the container leaves container handling system 1, so that at the end there is a relationship between the respective transport elements 6 of rotary machines 2 to 5 and a position of respective drives 14*a* to 14*d*.

During operation of container handling system 1, it can therefore be determined simply based on the current position of a drive which transport element 6 takes over a container when it enters the respective rotary machine.

The current transport position of a container can also be easily determined by way of the current position of respective drives 14*a* to 14*d*. This is because the locations of transfer points 7 to 10 are known, as is the number of transport steps between the respective transfer points. Furthermore, it is known how far respective drives 14*a* to 14*d* rotate during a transport step. This allows the number of transport steps, and therefore the current transport position, to be determined.

In order to log the transport of the containers through container handling system 1, memory device 13 comprises a shift register 20. Such a shift register 20 is shown schematically in FIG. 3.

Shift register 20 comprises a number N of memory elements 21, in each of which data assigned to a container can be stored. This data can comprise an identifier of the container. Additionally or alternatively, this data can comprise one or more identifiers of transport elements 6 that are involved in transporting the container through container handling system 1. In the shift register shown in FIG. 3, each memory element 21 is configured to store the identifier of a container and the respective identifier of a transport element 6 in rotary machines 2 to 5. This is indicated by the division of memory elements 21. Storing the identifier of the container is optional only.

Figure 3:
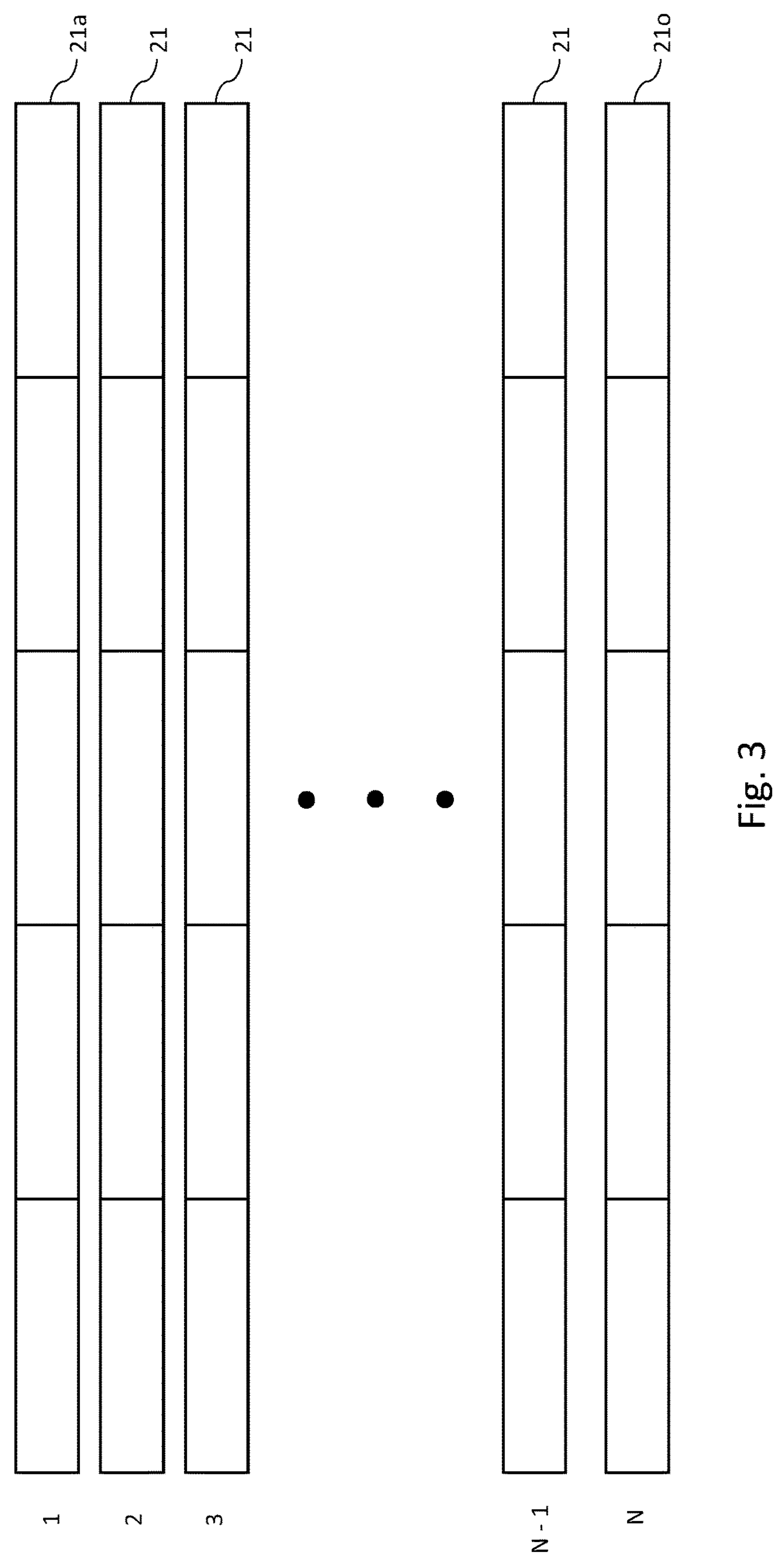
FIG. 3 schematically shows a shift register.

The number N of memory elements 21 in shift register 20 corresponds to the number of transport positions of container handling system 1. Shift register 20 in the embodiment shown in FIG. 1 would therefore comprise N=113 memory elements. Memory elements 21 in FIG. 3 are shown in ascending order from top to bottom. In other words, uppermost memory element 21*a* is the first memory element of shift register 20, and lowermost memory element 210 is the last memory element of shift register 20. For better understanding, the memory elements in the drawing are numbered from 1 to N in ascending order.

Uppermost memory element 21*a* therefore corresponds to position 7 shown in FIG. 1 at which the container is transferred to rotary machine 2. Lowermost memory element 210 corresponds to last transport position 11 shown in FIG. 1.

During operation of container handling system 1, the data assigned to a specific container is stored in the memory element 21 which corresponds to the current transport position of the container. In particular, when the container is transferred to rotary machine 2 at transfer point 7, the identifier of the transport element transporting the container in rotary machine 2 is stored in memory element 21*a*. During transport of the container, the data is shifted into the respective memory element 21 in correspondence with the transport position of the container and updated if necessary. When the container leaves container handling system 1, the data assigned thereto is removed from shift register 20.

The memory process in shift register 20 during operation of container handling system 1 shall be explained with reference to FIGS. 4*a* to 4*c*.

Figure 4A:
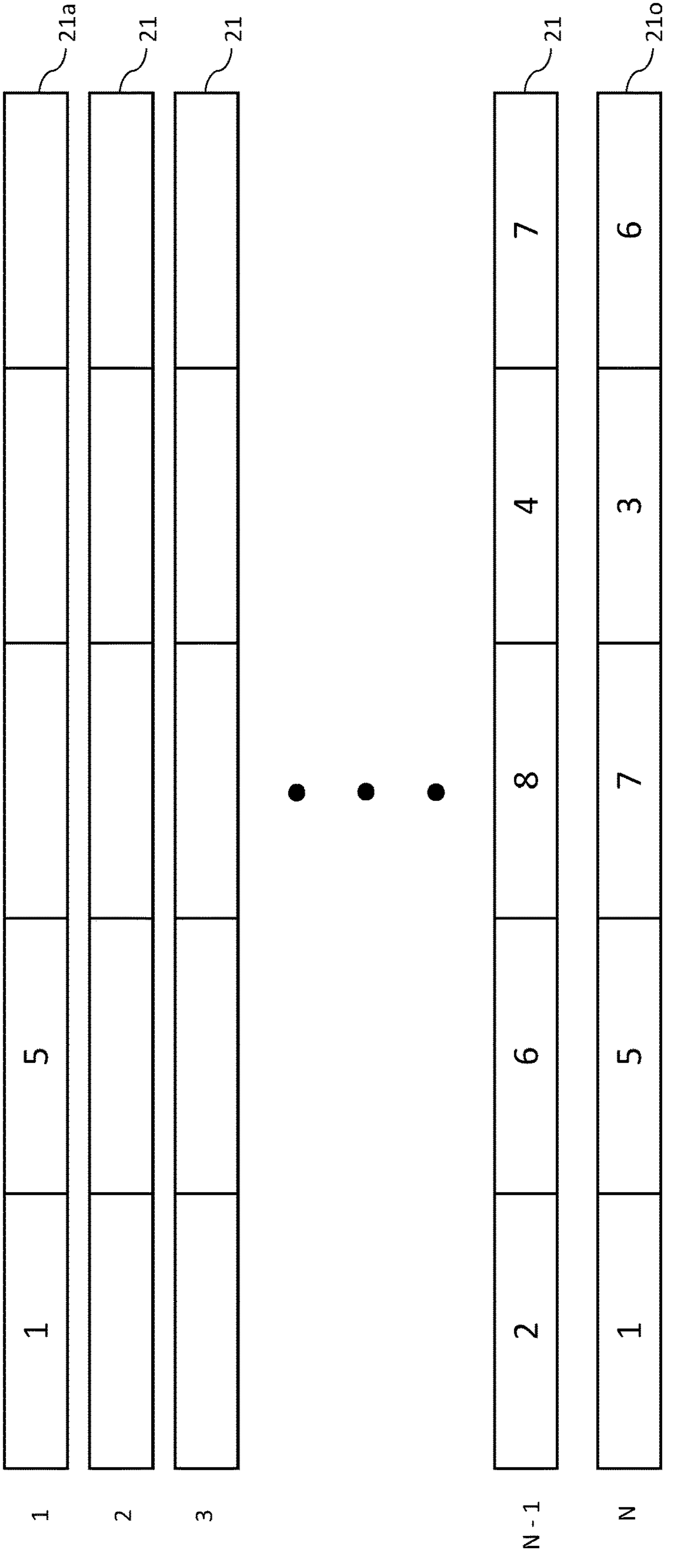
FIGS. 4*a* to 4*c* schematically show the storage of data in a shift register during operation of a container handling system.

FIG. 4*a* shows the situation in which a first container has just been transferred to rotary machine 2. It can be seen that the identifier of container "1" and the identifier of the transport element of rotary machine 2 "5" were stored in first memory element 21*a*. Other memory elements 21 contain no data.

Figure 4B:
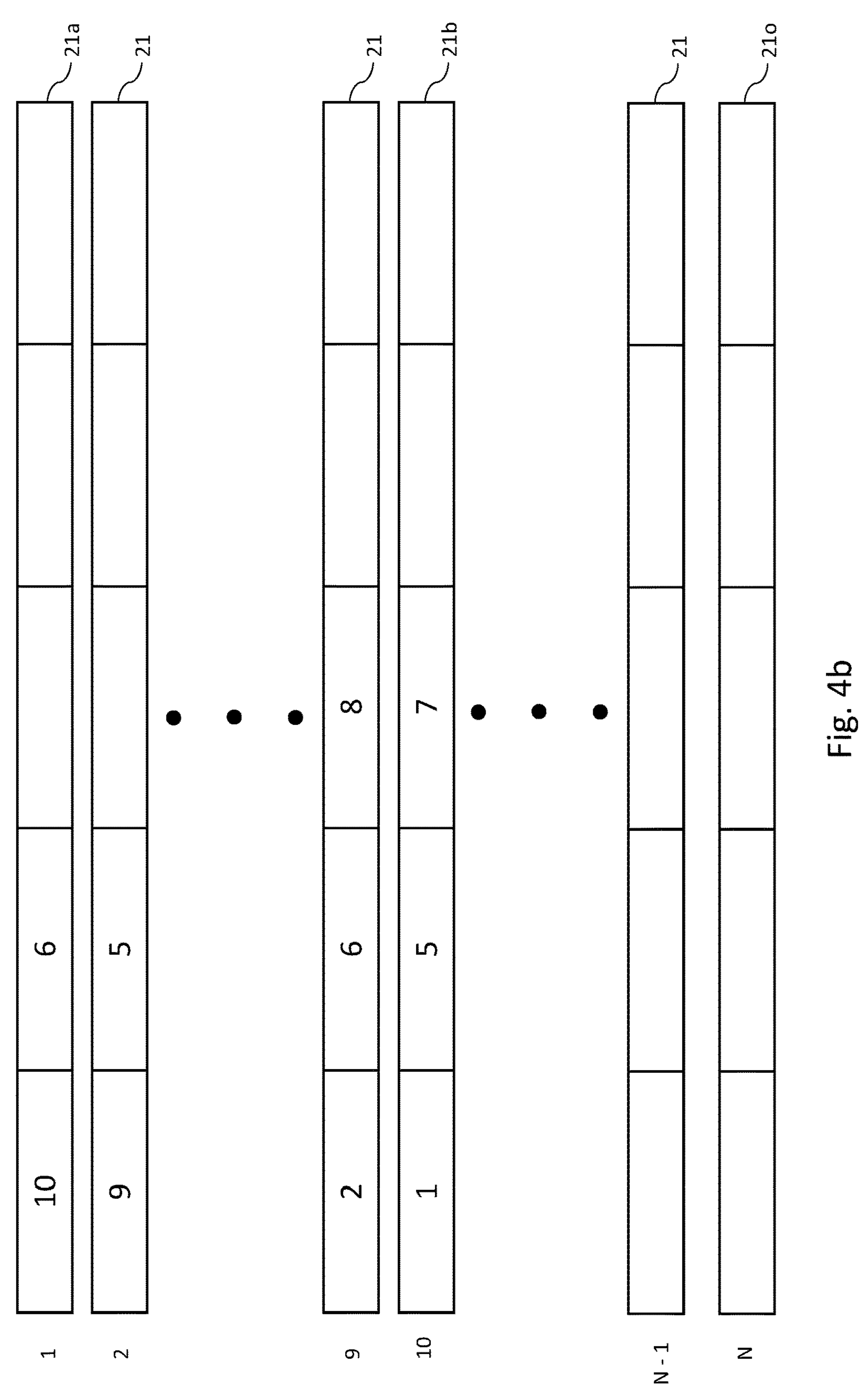

FIG. 4*b* shows the situation after 10 transport steps have taken place. It can be seen that the data of the container with identifier "1" has been shifted into tenth memory element 21*b* of shift register 20. Since the container is now in second rotary machine 3, the identifier of the transport element of second rotary machine "7" is stored in addition to the identifiers of the container and the transport element of first rotary machine 2 It can furthermore be seen that data that is assigned to the containers following container "1" has been stored in first to ninth memory elements 21.

Figure 4C:
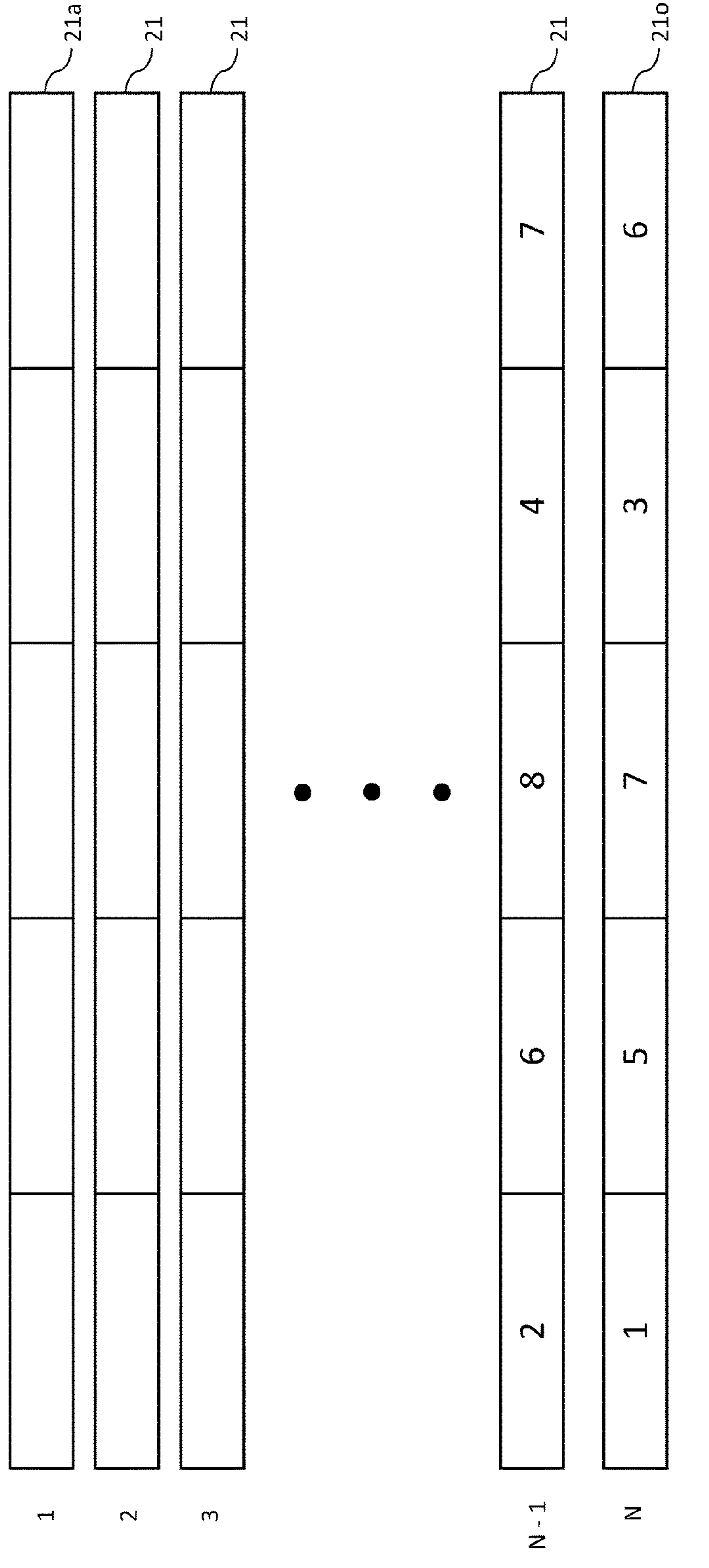

FIG. 4*c* shows the situation in which the container with the identifier "1" has reached the last transport position. It can be seen that the data assigned to container "1" is stored in last memory element 21*o* and now the identifiers of all transport elements that were involved in the transport of the container with identifier "1" through container handling system 1, have been stored in the memory element 21*o*.

As mentioned above, it can be determined during the operation of container handling system 1, for example, by control device 12, that an error has occurred during transport of a container. If it has been determined that an error has occurred, control device 12 reads out the data stored in memory element 21 of shift register 20 which corresponds to the current transport position of the container or the transport element, respectively, at which the error has been detected.

If, for example, an error was detected by way of a control unit 15 at the container with identifier "1" at transport position "9", and if a further transport step has taken place since the control data was recorded and transmitted, then control device 12 reads out the data from the tenth memory element. In the example illustrated in FIG. 4*b*, the control device thus reads out from memory element 21*b* the identifier of container "1", the identifier of the transport element of first rotary machine 2 "5", and the identifier of the transport element of second rotary machine 3 "7".

With this information, control device 12 can immediately determine that transport element "5" of first rotary machine 2 and transport element "7" of second rotary machine 3 may be involved in the error that has occurred. This information can be displayed to an operator of container handling system 1 who can use it to examine these transport elements directly for possible sources of error.

Furthermore, this information can enter into error statistics. In particular, after having determined that an error has occurred, one or more counters may be incremented. For example, counters for the type of error and the identifiers of the transport elements involved in the transport can be incremented. It is also possible for a counter for the combination of the type of error and the identifier of at least one of the transport elements involved in the transport to be incremented.

Since for a specific transport position, only the identifiers of the transport elements that were involved in the transport of the container so far are stored in memory element 21, it can be avoided, in the event that an error has been determined, that transport elements of a rotary machine are incorrectly included which the container has not yet passed through, and therefore cannot be involved in the occurrence of the error.

It goes without saying that the features mentioned in the embodiments described above are not restricted to these special combinations and are also possible in any other combination.

The invention claimed is:

1. A container handling system, comprising:

a first rotary machine comprising a plurality of transport elements for transporting one container each along a first conveying path;

a second rotary machine comprising a plurality of transport elements for transporting one container each along a second conveying path, where said second conveying path is arranged downstream of said first conveying path;

a memory device; and a control device;

where said control device during transport of a container through said container handling system is configured to determine that a first transport element transports said container in said first rotary machine and to store an identifier assigned to said first transport element in said memory device;

to determine that a second transport element transports said container in said second rotary machine and to store an identifier assigned to said second transport element in said memory device;

to ascertain whether an error is occurring during transport of said container through said container handling system; and to retrieve at least one stored identifier from said memory device if it is ascertained that the error has occurred during transport of said container;

wherein said memory device comprises a shift register, and wherein said control device is configured to store the identifier of said first transport element and of said second transport element in said shift register, wherein said shift register has a predetermined number of memory elements, wherein the predetermined number of memory elements corresponds to a number of transport positions that said container passes through during transport through said container handling system, wherein said container is moved on from one transport position to the next by a transport step, wherein said control device is configured to determine a first transport position at which said container is located at a first point in time and to store the identifier of said first transport element and/or of said second transport element in said memory element that corresponds to said first transport position, and wherein said control device is configured to determine that, at a second point in time, a specific number of transport steps has taken place since the first point in time, and to store in said memory element the identifier of said first transport element and/or of said second transport element which corresponds to a transport position at which said container is located at the second point in time based on the specific number of transport steps.

2. The container handling system according to claim 1, wherein said control device is configured to determine the identifier of said first transport element and of said second transport element based on a position of a drive of said first rotary machine or of said second rotary machine.

3. The container handling system according to claim 1, wherein said control device is configured:

to not store the identifier of said second transport element in said memory device as long as said container is disposed on said first conveying path, or to store a placeholder as the identifier of said second transport element in said memory device as long as said container is disposed on said first conveying path.

4. The container handling system according to claim 3, wherein the placeholder stored as the identifier of said second transport element in said memory device is zero.

5. The container handling system according to claim 1, wherein said control device is configured to increment at least one counter for a number of errors for each rotary machine if it is ascertained that an error has occurred during transport of said container along said conveying path of this rotary machine or of a downstream rotary machine.

6. The container handling system according to claim 5, wherein the at least one counter comprises a counter for a type of error and/or a counter for said first rotary machine and/or a counter for a rotary machine downstream of said first rotary machine, and/or a counter for the identifier of said first transport element, and/or a counter for the identifier of said second transport element.

7. The container handling system according to claim 1, wherein said control device is configured for each rotary machine to link the identifier of at least one transport element of said respective rotary machine to a position of a drive of said respective rotary machine.

8. The container handling system according to claim 1, wherein determining the first position at which said container is located at said first point in time based on a position of a drive of said first rotary machine or of said second rotary machine.

9. A method for controlling a container handling system, comprising:

determining that a first transport element of a first rotary machine of said container handling system transports a container in said first rotary machine along a first conveying path and storing in a memory device of said container handling system an identifier assigned to said first transport element;

determining that a second transport element of a second rotary machine of said container handling system transports said container in said second rotary machine along a second conveying path and storing in the memory device of said container handling system an identifier assigned to said second transport element;

ascertaining whether an error is occurring during transport of said container through said container handling system;

retrieving at least one stored identifier from said memory device if it is ascertained that the error has occurred during transport of said container;

storing the identifier of said first transport element and of said second transport element in a shift register of said memory device, where said shift register has a predetermined number of memory elements, where the predetermined number of memory elements corresponds to a number of transport positions that said container passes through during transport through said container handling system, where said container is moved on from one transport position to the next by a transport step;

determining a first transport position at which said container is located at a first point in time and storing said identifier of said first transport element and/or of said second transport element in said memory element that corresponds to said first transport position; and determining that, at a second point in time, a specific number of transport steps has taken place since the first point in time, and storing in said memory element the identifier of said first transport element and/or of said second transport element which corresponds to a transport position at which said container is located at the second point in time based on the specific number of transport steps.

10. The method according to claim 9, further comprising:

determining said identifier of said first transport element and of said second transport element based on a position of a drive of said first rotary machine or of said second rotary machine.

11. The method according to claim 9, further comprising:

not storing the identifier of said second transport element in said memory device as long as said container is disposed on said first conveying path, or storing a placeholder as the identifier of said second transport element in said memory device as long as said container is disposed in said first conveying path.

12. The method according to claim 9, further comprising:

incrementing at least one counter for a number of errors if it is ascertained that an error has occurred during transport of said container along said conveying path of this rotary machine or of a downstream rotary machine.

13. The method according to claim 12, where the at least one counter comprises a counter for a type of error and/or a counter for said first rotary machine and/or a counter for a rotary machine downstream of said first rotary machine, and/or a counter for the identifier of said first transport element, and/or a counter for the identifier of said second transport element.

14. The method according to one of the claim 9, further comprising:

linking, for each rotary machine, the identifier of at least one transport element of said respective rotary machine to a position of a drive of said respective rotary machine.

* * * * *